United States Patent
Zhang et al.

(10) Patent No.: US 11,388,333 B2
(45) Date of Patent: Jul. 12, 2022

(54) AUDIO GUIDED IMAGE CAPTURE METHOD AND DEVICE

(71) Applicant: SZ DJI TECHNOLOGY CO., LTD., Shenzhen (CN)

(72) Inventors: Liliang Zhang, Shenzhen (CN); Ping Liu, Shenzhen (CN); Lei Pang, Shenzhen (CN); Xinan Xu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/870,600

(22) Filed: May 8, 2020

(65) Prior Publication Data

US 2020/0275018 A1 Aug. 27, 2020

Related U.S. Application Data

(63) Continuation of application No. PCT/CN2017/114037, filed on Nov. 30, 2017.

(51) Int. Cl.
*H04N 5/232* (2006.01)
*G10L 17/00* (2013.01)

(52) U.S. Cl.
CPC ......... *H04N 5/23222* (2013.01); *G10L 17/00* (2013.01); *H04N 5/23219* (2013.01); *H04N 5/23299* (2018.08)

(58) Field of Classification Search
None
See application file for complete search history.

(56) References Cited

U.S. PATENT DOCUMENTS

| | | | | |
|---|---|---|---|---|
| 10,277,858 | B2* | 4/2019 | Kankaanpaa | G06K 9/00711 |
| 10,616,726 | B1* | 4/2020 | Freeman, II | H04W 8/02 |
| 2015/0092052 | A1 | 4/2015 | Shin et al. | |
| 2017/0221272 | A1* | 8/2017 | Li | G06T 19/20 |
| 2018/0150831 | A1* | 5/2018 | Dolan | G06Q 20/367 |
| 2018/0158197 | A1* | 6/2018 | Dasgupta | G06K 9/726 |
| 2019/0137597 | A1* | 5/2019 | Glover | G01S 3/02 |
| 2019/0339949 | A1* | 11/2019 | Ismail | G06F 3/0483 |
| 2020/0084540 | A1* | 3/2020 | John | H04R 29/005 |
| 2020/0275058 | A1* | 8/2020 | Graham | H04L 67/306 |

FOREIGN PATENT DOCUMENTS

| | | |
|---|---|---|
| CN | 203014978 U | 6/2013 |
| CN | 103491307 A | 1/2014 |
| CN | 103685906 A | 3/2014 |
| CN | 103957359 A | 7/2014 |
| CN | 104135645 A | 11/2014 |
| CN | 104580992 A | 4/2015 |

(Continued)

OTHER PUBLICATIONS

The World Intellectual Property Organization (WIPO) International Search Report for PCT/CN2017/114037 dated Aug. 17, 2018 6 pages.

*Primary Examiner* — Edemio Navas, Jr.
(74) *Attorney, Agent, or Firm* — Anova Law Group, PLLC

(57) ABSTRACT

An image capture method includes recognizing audio information, controlling a gimbal to rotate according to the audio information to control a capture direction of a camera, and controlling the camera to execute a capturing function in response to determining that the camera meets a trigger condition.

18 Claims, 4 Drawing Sheets

(56) References Cited

FOREIGN PATENT DOCUMENTS

| | | | |
|---|---|---|---|
| CN | 104954673 A | 9/2015 | |
| CN | 105116920 A | 12/2015 | |
| CN | 105357442 A | 2/2016 | |
| CN | 105704451 A | 6/2016 | |
| CN | 105979126 A | 9/2016 | |
| CN | 106042005 A | 10/2016 | |
| CN | 106331466 A | 1/2017 | |
| CN | 106875512 A | 6/2017 | |
| CN | 106888361 A | 6/2017 | |
| CN | 106899761 A | 6/2017 | |
| CN | 107277368 A | 10/2017 | |
| CN | 107347145 A | 11/2017 | |
| WO | WO-2015172630 | * 11/2015 | ......... H04N 5/23212 |

* cited by examiner

AUDIO GUIDED IMAGE CAPTURE METHOD AND DEVICE

CROSS-REFERENCE TO RELATED APPLICATION

This application is a continuation of International Application No. PCT/CN2017/114037, filed Nov. 30, 2017, the entire contents of which is incorporated herein by reference.

TECHNICAL FIELD

The present disclosure relates to image capturing, and more particularly, to an image capture method and device.

BACKGROUND

In the conventional technologies, a selfie requires the user to hold the camera to adjust the image capture angle and manually trigger the image capture button of the camera to capture image. The image capturing distance and angle are limited by the length of the arm of the user. Specifically, since the user is required to hold the camera, the user cannot pose freely, and the attitude of the user is limited. Further, the user manually pressing the image capturing button results in a vibration of the camera, and hence leads to a reduced capturing quality of the image.

SUMMARY

In accordance with the disclosure, there is provided an image capture method including recognizing audio information, controlling a gimbal to rotate according to the audio information to control a capture direction of a camera, and controlling the camera to execute a capturing function in response to determining that the camera meets a trigger condition.

REFERENCE NUMERALS

100—Camera
110—Camera body
120—Camera lens
130—Display screen
200—Gimbal
210—Yaw axis
220—Pitch axis
230—Roll axis
300—Processor

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Example embodiments will be described with reference to the accompanying drawings. In the case of no conflict, the following embodiments and features of the embodiments can be combined with each other.

Figure 1:
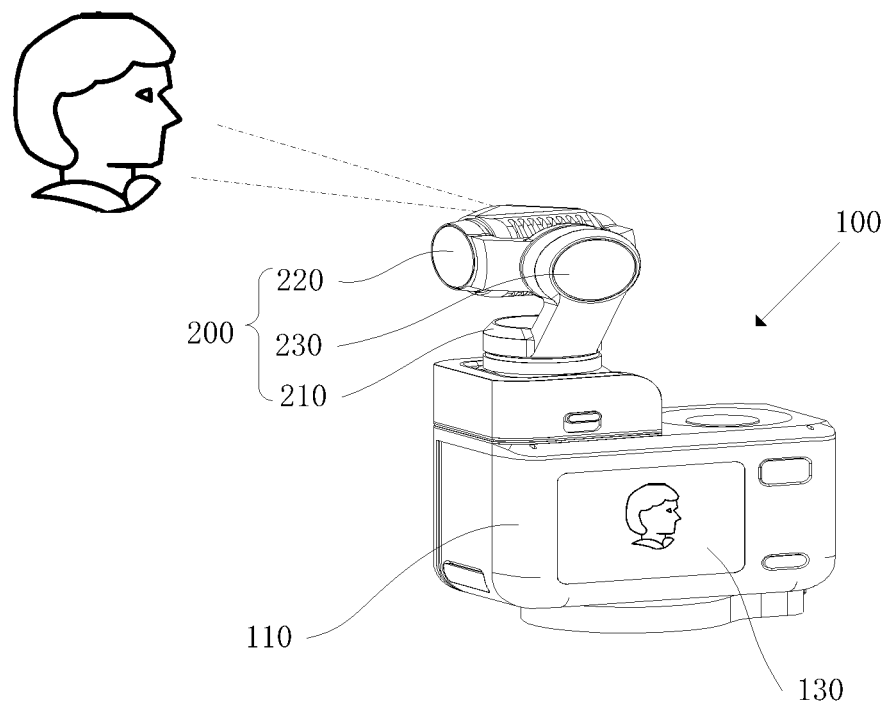
FIG. 1 is a perspective view of an image capture device according to an embodiment of present disclosure.
Figure 2:
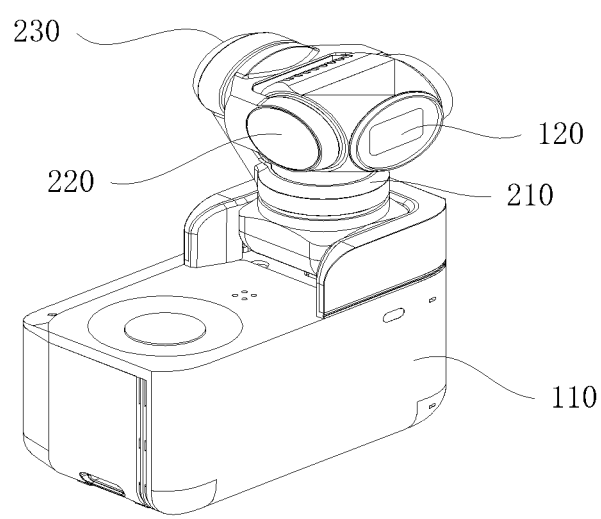
FIG. 2 is a perspective view of the image capture device according to an embodiment of present disclosure viewing from another direction.

As shown in FIG. 1 and FIG. 2, an embodiment of present disclosure provides an image capture device. The image capture device includes a camera 100 and a gimbal 200. The camera 100 is at least partially mounted at the gimbal 200, and the image capture direction of the camera 100 can be controlled by the gimbal 200. Specifically, the camera 100 includes a camera body 110 and a camera lens 120. The gimbal 200 is attached to the camera body 110, and the camera lens 120 is mounted at the gimbal 200. The gimbal 200 controls the rotation of the camera lens 120, so as to control the image capture direction of the camera lens 120. The camera lens 120 may further include a lens and an image sensor corresponding to the lens, e.g., a Charge-coupled Device (CCD). The implementation of the gimbal 200 controlling the image capture direction of the camera 100 is not limited to this. For example, in other embodiments, the whole part of the camera 100 is mounted at the gimbal 200, and the gimbal 200 controls the rotation of the entire camera 100, so as to control the image capture direction of the camera 100.

The camera body 110 further includes a display screen 130, which can display the image captured by the camera 100 in real time. In some embodiments, the display screen 130 faces the user.

In this embodiment, the gimbal 200 can be a two-axis gimbal or a three-axis gimbal. An example is further described in this embodiment by using a three-axis gimbal as the gimbal 200. As shown in FIG. 1 and FIG. 2, the gimbal 200 includes a yaw axis 210, a pitch axis 220, and a roll axis 230, which are configured to control the states of the camera 100 in the yaw direction, the pitch direction, and the roll direction, respectively.

Figure 3:
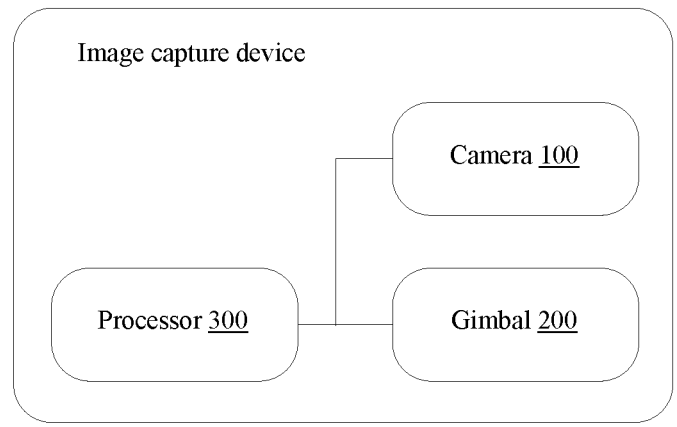
FIG. 3 is a structural block diagram showing an image capture device according to an embodiment of present disclosure.

As shown in FIG. 3, an image capture device further includes a processor 300. The processor 300 can obtain real-time images captured by the camera 100, and control the rotation of the gimbal 200 and the operation of the camera 100. In this embodiment, the processor 300 can be a gimbal processor, or a camera processor, or a gimbal processor and a camera processor, where the gimbal processor and the camera processor are in communication connection. The processor can also be an independent processor, which is in communication connections with the gimbal processor and the camera processor, respectively. In this embodiment, an independent processor is used as an example of the processor 300 for illustrative purposes.

Figure 4:
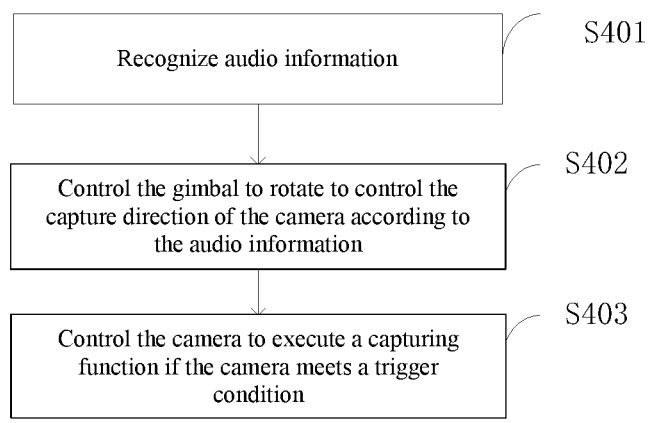
FIG. 4 is a flow chart showing an image capture method according to an embodiment of present disclosure.

FIG. 4 is a flow chart showing an image capture method consistent with the disclosure. The image capture method can be implemented in, e.g., the processor 300 of the image capture device. An image capture method can include processes described below.

At S401, audio information is recognized. The audio information can include a direction of an audio source and an audio content. The audio source refers to an object that emits the audio information, and the direction of the audio source refers to the direction of the audio source with respect to the camera 100. The audio content may include control instruction for instructing the camera 100 to be controlled (also referred to as a "controlled camera") to execute a corresponding function, and may include an audio content other than the control instruction. Further, the control instruction is predefined to distinguish it from the audio content other than the control instruction. In this embodiment, the control instruction may include a camera identifier of the camera 100 to be controlled and an action to be executed by the camera 100. The action to be executed by the camera 100 can include, e.g., a capturing function, activating a tracking function, stopping the tracking function, and/or other actions to be executed. The audio source of the audio information can further be a mechanical device or a user. In the embodiment of the present disclosure, when the audio source is a mechanical device, the target object is a user that is closest to the audio source. On the other hand, when the audio source is a user, the target object is the audio source, i.e., the user that emits the audio information.

In one embodiment, a capture device may further include at least one voice recognition device (not shown), and the at least one voice recognition device is communicatively connected to the processor 300. In some embodiments, the at least one voice recognition device is arranged at the camera body 110, and S401 includes recognizing audio information based on the at least one of the voice recognition device. In this embodiment, the voice recognition device collects voice data, processes the voice data into audio information (that may include the direction of the audio source and the voice content) and sends it to the processor 300. In some embodiments, one or more voice recognition devices can be provided. When there are two or more voice recognition devices, they can be set at different positions of the camera body 110, so as to recognize the audio information from different directions and obtain accurate direction of the audio source. The rotation of the gimbal 200 can be controlled according to the audio direction.

In another embodiment, the camera 100 may include an audio collection device (not shown), e.g., a microphone or another audio collection device. The process at S401 can include receiving voice data collected by the audio collection device of the camera 100, and recognizing the audio information of the voice data. Recognizing the audio information of the voice data may further include recognizing the direction of the audio source of the voice data according to a voice recognition model, thereby controlling the rotation of the gimbal 200 to control the camera 100 to automatically align with the direction of the audio source. Recognizing the audio information of the voice data may further include recognizing the audio content of the voice data according to the voice recognition model. Before the direction of the audio source and/or the audio content of the voice data is recognized according to the voice recognition model, the voice recognition model can be obtained based on a deep learning technology. Specifically, the voice recognition model can be obtained based on deep learning technology training by collecting a sufficient amount (which can be set according to need) of voice data of various countries and regions, and the obtained voice recognition model has strong robustness and wide applicability, and can execute an accurate recognition of various populations in various scenarios. Compared with the conventional method that uses artificially designed voice characteristic to complete the classification of the voice, the voice recognition method in the present disclosure based on deep learning technology has higher accuracy.

In other embodiments, the process at S401 can be executed by an independent audio recognition device that is communicatively connected to the processor 300. After recognizing the audio information, the audio recognition device can send the audio information to the processor 300.

At S402, the gimbal 200 is controlled to rotate according to the audio information to control the capturing direction of the camera 100.

Figure 5:
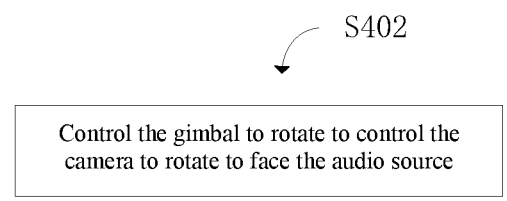
FIG. 5 is a flow chart showing an image capture method according to an example embodiment of present disclosure.

At S402, the rotation of the camera is controlled by the rotation of the stage to achieve a user positioning. In this embodiment, compared to the conventional selfie method using a handheld camera 100, the rotation of the gimbal 200 can be controlled by the audio information to control the capturing direction of the camera 100, and a plurality of positions can be monitored simultaneously. As shown in FIG. 5, S402 further includes, controlling the rotation of the gimbal 200 to control the camera 100 to rotate to face the audio source. Specifically, the camera lens 120 can be driven by the gimbal 200 to rotate to face the audio source, and aim at the capturing target.

After the audio information is recognized, before the gimbal 200 is controlled to rotate to control the capturing direction of the camera 100 according to the audio information, filtering processing is performed on the audio information to filter out noise and obtain more accurate audio information, thereby tracking the target accurately.

At S403, when it is determined that the camera 100 meets a trigger condition, the camera 100 is controlled to execute a capturing function. The capturing function can be recording a video or shooting an image, and can be selected according to the actual needs of the user. In the embodiment of the present disclosure, the gimbal 200 is controlled to rotate to control the capturing direction of the camera 100 through the audio information. When the camera 100 meets a trigger condition, the camera 100 can be controlled to automatically execute a capturing function without a need for the user to manually operate the camera 100. On one hand, the distance between the camera 100 and the user can be longer, and the capturing direction of the camera 100 can be more flexible. On the other hand, the hands of the user can be freed, and the user can pose freely.

In this embodiment, the camera 100 can be controlled to execute a capturing function, such as an instant capturing function, a time-lapse capturing function, or a continuous capturing function. The capturing function executed by the camera 100 can be preset by the user to meet different user needs. In one embodiment, the capturing function of the camera 100 preset by the user is the instant capturing function, and S403 can specifically include, when it is determined that the camera 100 meets the trigger condition, controlling the camera 100 to immediately execute the capturing function.

In another embodiment, the capturing function of the camera 100 preset by the user is the time-lapse capturing function, and S403 can specifically include, when it is determined that the camera 100 meets the trigger condition, controlling the camera 100 to execute the time-lapse capturing function with a preset duration. The preset duration for controlling the camera 100 to delay the execution of the capturing function can be set according to user needs. For example, the preset duration can be 3 seconds. When it is determined that the camera 100 meets the trigger condition, the camera 100 is controlled to count down for 3 seconds before executing the capturing function to meet the need of the user.

In another embodiment, the capturing function of the camera 100 preset by the user is the continuous capturing function, and S403 can specifically include, when it is determined that the camera 100 meets the trigger condition, controlling the camera 100 to execute the continuous capturing function. In some embodiments, controlling the camera 100 to execute the continuous capturing function includes controlling the camera 100 to continuously capture two or more images, e.g., 5 images. When it is determined that the camera 100 meets the trigger condition, the camera 100 is controlled to capture 5 images continuously and the time interval for capturing the two or more images can be set to meet different user needs.

Figure 6:
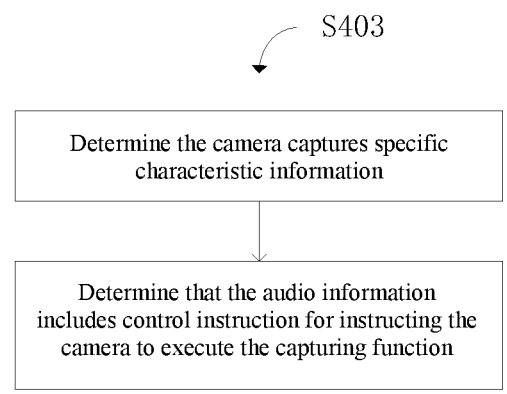
FIG. 6 is a flow chart showing an image capture method according to another example embodiment of present disclosure.

In this embodiment, as shown in FIG. 6, the trigger condition can include determining that the camera 100 captures specific characteristic information. In this embodiment, the specific characteristic information is characteristic information of a user, e.g., facial characteristic information, profile information of a user, etc. In this embodiment, facial characteristic information is further described as an example of the specific characteristic information. Determining that the camera 100 captures the specific characteristic information includes recognizing the facial characteristic information based on a visual recognition technology (e.g., a face recognition model) according to the capturing image of the camera 100. In some embodiments, the face recognition model can be obtained based on a deep learning technology. Specifically, the face recognition model can be obtained based on deep learning technology training by collecting a sufficient amount (which can be set according to need) of face data of various countries and regions, and the obtained face recognition model has strong robustness and wide applicability, and can execute an accurate recognition of various populations in various scenarios. Compared with the conventional method that uses artificially designed facial characteristic to complete the classification of the face, the face recognition method in the present disclosure based on deep learning technology has higher accuracy.

In this embodiment, the audio information may include control instruction that is configured to trigger the camera 100 to execute a corresponding function and completely free the hands of the user, leading to a higher degree of automation in image capturing by the camera 100. The control instruction can include a camera identifier of the camera 100 to be controlled and an action to be executed by the camera 100. In one embodiment, the action to be executed by the camera 100 is configured to instruct the camera 100 to execute a capturing function. As shown in FIG. 6, the trigger condition can further include, it is determined that the audio information includes control instruction for instructing the camera 100 to execute the capturing function. Instead of manually triggering the capturing button of the camera 100, the camera 100 is triggered through the audio information to execute the capturing function. On one hand, the hands of the user can be freed, and the distance between the camera 100 and the user is not limited, the capturing angle can be more flexible, and the user can pose freely. On the other hand, the camera 100 does not vibrate, and the obtained video or image has better quality.

In another embodiment, the action to be executed by the camera 100 is configured to instruct the camera 100 to activate a tracking function. After it is determined that the camera 100 captures specific characteristic information, the gimbal 200 is controlled to rotate to control the camera 100 to track the target object corresponding to the specific characteristic information, so as to enable the automatic tracking function of the camera 100 through the audio information. Manually turning on the automatic tracking function of the camera 100 by the user is not needed, making it convenient and fast.

In another embodiment, the action to be executed by the camera 100 is configured to instruct the camera 100 to stop a tracking function. After it is determined that the camera 100 captures specific characteristic information, the gimbal 200 is controlled to stop rotating to control the camera 100 to stop tracking the target object corresponding to the specific characteristic information, so as to disable the automatic tracking function of the camera 100 through the audio information. Manually turning off the automatic tracking function of the camera 100 by the user is not needed, making it convenient and fast.

In one embodiment, a camera identifier of the camera 100 to be controlled is identifier 1, and the control instructions of the camera 100 of identifier 1 can include "ID.1, Selfie Mode," "ID.1, Capture," and "ID.1, Stop." Specifically, when it is recognized that the user emits an audio content of "ID.1, Selfie Mode," the camera 100 can be controlled to rotate to face the user through the gimbal 200, thereby enabling the automatic tracking function of the camera 100. The gimbal 200 can be further controlled based on a visual recognition technology to rotate to control the camera 100 to track the target object. When it is recognized that the user emits an audio content of "ID.1, Capture," the camera 100 can be controlled to execute the capturing function. When the camera 100 recognizes that the user emits an audio content of "ID.1, Stop," the gimbal 200 can be controlled to stop rotating, thereby disabling the automatic tracking function of the camera 100. In this embodiment, the camera 100 can be controlled by using the audio information to activate the automatic tracking function, execute the capturing function, and stop the automatic tracking function. The camera 100 can be controlled without a manual operation by the user, and the distance between the camera 100 and the user can be longer. The hands of the user can be freed and the image captured by the camera 100 can be more stable. In this embodiment, before the camera 100 is controlled to execute the function of turning off the automatic tracking according to the audio content of "ID.1, Stop," the camera 100 has turned on the automatic tracking function. Specifically, controlling the camera 100 to execute the function of turning off the automatic tracking according to the audio content of "ID.1, Stop" is executed after the camera 100 is controlled to execute the function of turning on the automatic tracking according to the audio content of "ID.1, Stop." Further, after the camera 100 is controlled to turn off the automatic tracking function, if it is recognized that the user sends another control instruction that needs to be responded again, for example, the user sends out an audio content of "ID.1, Selfie Mode," the gimbal 200 can be controlled to rotate again to control the camera 100 to turn on the automatic tracking function. Otherwise, the camera 100 cannot execute the automatic tracking function. In this embodiment, the automatic tracking function can refer to a function of controlling the rotation of the gimbal 200 according to the audio information and visual recognition technology, thereby enabling the camera 100 to locate and lock the user, and generate a continuous following function.

In some embodiments, after S402, the method can further include recognizing the target object corresponding to the audio information and obtaining the characteristic information of the target object. When the audio source of the audio information is a mechanical device, the target object is a user closest to the audio source. For example, when a user opens a door, the audio source is the door, and the target object recognized by the camera 100 is the user who opens the door. The gimbal 200 can automatically rotate to face the door and use visual recognition to detect the human face. When the audio source of the audio information is a user, the target object is the audio source. The gimbal can be controlled to rotate by voice to drive the camera 100 to face the speaking user and detect the human face, thereby completely free the hands of the user.

In some embodiments, the method can further include, after recognizing the target object corresponding to the audio information and obtaining the characteristic information of the target object, controlling the gimbal 200 to rotate to control the camera 100 to track the target object according to the characteristic information. In this embodiment, the camera 100 implements the tracking of the target object based on a visual recognition technology, and has high accuracy in recognizing the target object. Controlling the gimbal 200 to rotate to control the camera 100 to track the target object according to the characteristic information can include controlling the gimbal 200 to rotate to position the target object in the capturing frame of the camera 100 according to the characteristic information, to realize an automatic composition of the camera 100. This can ensure that the camera 100 can always track the target object, and the degree of automation and accuracy of the capturing method are high, providing a relatively great convenience to the user.

In some embodiments, the gimbal 200 controlling the camera 100 to rotate to position the target object in the capturing frame of the camera 100 can include controlling the gimbal 200 to rotate to position the target object at a specific position in the capturing frame of the camera 100. For example, the face of the target object can be controlled to be positioned at the middle position of the capturing frame, or the face of the target object can be controlled to be positioned at the ⅔ height line in the capturing frame, or another portion of the target object can be controlled to be positioned at the middle position, the ⅔ height line, or another position in the capturing frame.

In some embodiments, the gimbal 200 controlling the camera 100 to rotate to position the target object in the capturing frame of the camera 100 can include controlling the gimbal 200 to rotate so that the target object occupies a preset amount of pixels in the capturing frame of the camera 100. For example, the pixels of the target object in the capturing frame can be controlled to be 800*600. Further, the target object can be controlled to be completely positioned in the capturing frame, or at least part of the target object (including a human face) can be controlled to be positioned in the capturing frame.

Figure 7:
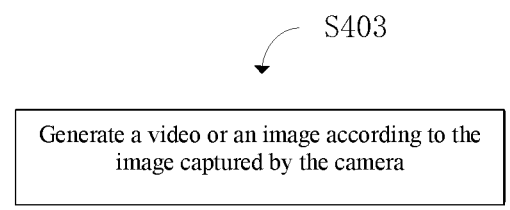
FIG. 7 is a flow chart showing an image capture method according to another example embodiment of present disclosure.

In this embodiment, video recording or image capturing can be implemented according to a capturing frame of the camera 100, and a manual operation by the user is not needed, which in turn completely frees the hands of the user and leads to a good user experience. In some embodiments, as shown in FIG. 7, controlling the gimbal 200 to rotate to control the camera 100 to track the target object according to the characteristic information may further include generating a video or an image according to the capturing image of the camera 100 to realize automatic capturing of the target object.

Figure 8:
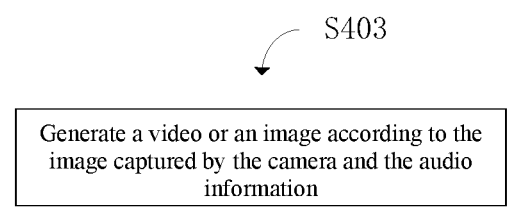
FIG. 8 is a flow chart showing an image capture method according to another example embodiment of present disclosure.

In some embodiments, as shown in FIG. 8, controlling the gimbal 200 to rotate to control the camera 100 to track the target object according to the characteristic information may further include generating a video or an image according to the capturing image of the camera 100 and audio information to realize automatic capturing of the target object, where the obtained video or image has richer contents. In this embodiment, when the audio information is an audio content other than control instruction, the generated video or the image may carry the current audio information.

In some embodiments, a user may send control instruction according to a generated video or image to trigger the camera 100 to execute a corresponding function. The user can also pose freely or move the position thereof, etc., according to the generated video or image, giving the user a richer selfie experience.

In some embodiments, after the target object corresponding to the audio information is recognized and the characteristic information of the target object is obtained, audio information can be recognized again, and the target object corresponding to the currently recognized audio information can be recognized, and the characteristic information of the target object corresponding to the currently recognized audio information can be obtained. It can be determined whether the target object corresponding to the currently recognized audio information and the target object corresponding to the previously recognized audio information are the same target object. If the target object corresponding to the currently recognized audio information and the target object corresponding to the previously recognized audio information are the same target object, the gimbal 200 can be controlled to drive the camera 100 to continuously track the target object. On the other hand, if the target object corresponding to the currently recognized audio information and the target object corresponding to the previously recognized audio information are different target objects, the gimbal 200 can be controlled to rotate the camera 100 to face the target object corresponding to the currently recognized audio information, thereby switching the tracked target object and ensuring that the camera 100 is aligned with the target object that is currently emitting the audio information in real time.

Specifically, if the difference between the characteristic information of the target object corresponding to the currently recognized audio information and the characteristic information of the target object corresponding to the previously recognized audio information is larger than a preset difference value, it is indicated that the target object corresponding to the currently recognized audio information and the target object corresponding to the previously recognized audio information are different target objects. At this time, the camera 100 can be controlled to rotate to face the target object corresponding to the currently recognized audio information, and track the new target object. On the other hand, if the difference between the characteristic information of the target object corresponding to the currently recognized audio information and the characteristic information of the target object corresponding to the previously recognized audio information is smaller than or equal to the preset difference value, it is indicated that the target object corresponding to the currently recognized audio information and the target object corresponding to the previously recognized audio information are the same target object. The camera 100 can be controlled by the gimbal 200 to continuously track the target object.

In one embodiment, it can be determined whether the target objects recognized at two different moments are the same target object according to the facial characteristic information of the target objects recognized at the two different moments. When the difference between the facial characteristic information of the target objects recognized at the two different moments is larger than, e.g., 5%, it is indicated that the target objects recognized at the two different moments are different target objects. The camera 100 can be controlled by the gimbal 200 to rotate to face the most recently recognized target object. On the other hand, when the difference between the facial characteristic information of the target objects recognized at the two different moments is smaller than or equal to, e.g., 5%, it is indicated that the target objects recognized at the two different moments are the same target object. The camera 100 can be controlled by the gimbal 200 to always aim at the target object. In this embodiment, all the terms "object target" can refer to a user. When the audio source of the audio information is a mechanical device, the target object is the user closest to the audio source. When the audio source of the audio information is a user, the target object is the audio source, i.e., the user that is speaking.

The present disclosure also provides an image capture device, as shown in FIGS. 1-3. The image capture device includes a camera 100, a gimbal 200, and a processor 300. The camera 100 is at least partially mounted at the gimbal 200, and the image capture direction of the camera 100 can be controlled by the gimbal 200. Specifically, the camera 100 includes a camera body 110 and a camera lens 120. The gimbal 200 is attached to the camera body 110, and the camera lens 120 is mounted at the gimbal 200. The gimbal 200 controls the rotation of the camera lens 120, so as to control the image capture direction of the camera lens 120. The camera lens 120 may further include a lens and an image sensor corresponding to the lens, e.g., a Charge-coupled Device (CCD). The implementation of the gimbal 200 controlling the image capture direction of the camera 100 is not limited to this. For example, in other embodiments, the whole part of the camera 100 is mounted at the gimbal 200, and the gimbal 200 controls the rotation of the entire camera, so as to control the image capture direction of the camera 100.

In this embodiment, the gimbal 200 can be a two-axis gimbal or a three-axis gimbal. An example is further described in this embodiment by using a three-axis gimbal for the gimbal 200. As shown in FIG. 1 and FIG. 2, the gimbal 200 includes a yaw axis 210, a pitch axis 220, and a roll axis 230, which are configured to control the states of the camera 100 in the yaw direction, the pitch direction, and the roll direction, respectively.

Further, the processor 300 is communicatively connected to the camera 100 and the gimbal 200, respectively. The processor 300 can obtain real-time images captured by the camera 100, and control the rotation of the gimbal 200 and the operation of the camera 100. In this embodiment, the processor 300 can be a gimbal processor, or a camera processor, or a gimbal processor and a camera processor, where the gimbal processor and the camera processor are in communication connection. The processor can also be an independent processor, which is in communication connections with the gimbal processor and the camera processor respectively. In this embodiment, an independent processor is used as an example of the processor 300 for illustrative purposes.

In this embodiment, the processor 300 may include one or more, and may work individually or collectively. The processor 300 can be configured to recognize audio information, and control the capturing direction of the camera 100 according to the audio information. Specifically, in this embodiment, the processor is configured to control the gimbal to rotate to control the capturing direction of the camera lens 120 according to the audio information. Further, when it is determined that the camera 100 meets a trigger condition, the processor 300 can control the camera 100 to execute a capturing function. The capturing function can be recording a video or shooting an image, and can be selected according to the actual needs of the user. In the embodiment of the present disclosure, the processor 300 controls the capturing direction of the camera 100 through the audio information. When the camera 100 meets a trigger condition, the camera 100 can be controlled to automatically execute a capturing function without a need for the user to manually operate the camera 100. On one hand, the distance between the camera 100 and the user can be longer, and the capturing direction of the camera 100 can be more flexible. On the other hand, the hands of the user can be freed, and the user can pose freely.

The audio information can include a direction of an audio source and an audio content. The audio content may include control instruction for instructing the camera 100 to be controlled (also referred to as a "controlled camera") to execute a corresponding function, and may include an audio content other than the control instruction. Further, the control instruction is predefined to distinguish it from the audio content other than the control instruction. In this embodiment, the control instruction may include a camera identifier of the camera 100 to be controlled and an action to be executed by the camera 100. The action to be executed by the camera 100 can include, e.g., a capturing function, activating a tracking function, stopping the tracking function, and/or other actions to be executed. The audio source of the audio information can further be a mechanical device or a user.

In one embodiment, a capture device may further include a voice recognition device (not shown) that can be arranged at the camera body 110 and communicatively connected to the processor 300. In this embodiment, the voice recognition device is configured to recognize the audio information and send the audio information to the processor 300. The voice recognition device collects voice data, processes the voice data into audio information (that may include the direction of the audio source and the voice content) and sends it to the processor 300. In some embodiments, one or more voice recognition devices can be provided. When there are two or more voice recognition devices, they can be set at different positions of the camera body 110, so as to recognize the audio information from different directions and obtain accurate direction of the audio source.

In another embodiment, the camera 100 may include an audio collection device (not shown) that can be arranged at the camera body 110 and electrically connected to the processor 300. In this embodiment, the audio collection device is configured to collect the voice data and send the voice data to the processor 300 that recognizes the audio information of the voice data. The processor 300 recognizing audio information of the voice data may further include recognizing the direction of the audio source of the voice data according to a voice recognition model, thereby controlling the rotation of the gimbal 200 to control the camera 100 to automatically align with the direction of the audio source. The processor 300 recognizing the audio information of the voice data may further include recognizing the audio content of the voice data according to the voice recognition model. Before the direction of the audio source and/or the audio content of the voice data is recognized by the processor 300 according to the voice recognition model, the voice recognition model can be obtained based on a deep learning technology. Specifically, the voice recognition model can be obtained based on deep learning technology training by collecting a sufficient amount (which can be set according to need) of voice data of various countries and regions, and the obtained voice recognition model has strong robustness and wide applicability, and can execute an accurate recognition of various populations in various scenarios. Compared with the conventional method that uses artificially designed voice characteristic to complete the classification of the voice, the voice recognition method in the present disclosure based on deep learning technology has higher accuracy. In some embodiments, the audio collection device can be a microphone or other audio collection device.

The processor 300 controlling the gimbal 200 to rotate according to the audio information to control the capturing direction of the camera 100 can include controlling the rotation of the gimbal 200 to control the camera 100 to rotate to face the audio source to locate the user. Compared to the conventional holding method of the camera 100, the rotation of the gimbal 200 can be controlled by the audio information to control the capturing direction of the camera 100, and a plurality of positions can be monitored simultaneously.

After the audio information is recognized by the processor 300, before the gimbal 200 is controlled to control the capturing direction of the camera 100 according to the audio information, filtering processing is performed on the audio information to filter out noise and obtain more accurate audio information, thereby tracking the target accurately.

In this embodiment, the processor 300 can control the camera 100 to execute a capturing function, such as an instant capturing function, a time-lapse capturing function, or a continuous capturing function. The capturing function executed by the camera 100 controlled by the processor 300 can be preset by the user to meet different user needs. In one embodiment, the capturing function of the camera 100 preset by the user is the instant capturing function, and when it is determined that the camera 100 meets the trigger condition, the processor 300 can control the camera 100 to immediately execute the capturing function.

In another embodiment, the capturing function of the camera 100 preset by the user is the time-lapse capturing function, and when it is determined that the camera 100 meets the trigger condition, the processor 300 can control the camera 100 to execute the time-lapse capturing function with a preset duration. The preset duration for controlling the camera 100 to delay the execution of the capturing function controlled by the processor 300 can be set according to user needs. For example, the preset duration can be 3 seconds. When the processor 300 determines that the camera 100 meets the trigger condition, the processor 300 controls the camera 100 to count down for 3 seconds before executing the capturing function to meet the need of the user.

In another embodiment, the capturing function of the camera 100 preset by the user is the continuous capturing function, and when it is determined that the camera 100 meets the trigger condition, the processor 300 can control the camera 100 to execute the continuous capturing function. In some embodiments, the processor 300 controlling the camera 100 to execute the continuous capturing function includes controlling the camera 100 to continuously capture two or more images, e.g., 5 images. When the processor 300 determines that the camera 100 meets the trigger condition, the processor 300 controls the camera 100 to capture 5 images continuously and the time interval for capturing the two or more images can be set to meet different user needs.

In this embodiment, the trigger condition can include the processor 300 determines that the camera 100 captures specific characteristic information. In this embodiment, the specific characteristic information is characteristic information of a user, e.g., facial characteristic information, profile information of a user, etc. In this embodiment, facial characteristic information is further described as an example of the specific characteristic information. The processor 300 determining that the camera 100 captures the specific characteristic information includes recognizing the facial characteristic information based on a visual recognition technology (e.g., a face recognition model) according to the capturing image of the camera 100. In some embodiments, the face recognition model can be obtained by the processor 300 based on a deep learning technology. Specifically, the face recognition model can be obtained based on deep learning technology training by collecting a sufficient amount (which can be set according to need) of face data of various countries and regions, and the obtained face recognition model has strong robustness and wide applicability, and can execute an accurate recognition of various populations in various scenarios. Compared with the conventional method that uses artificially designed facial characteristic to complete the classification of the face, the face recognition method in the present disclosure based on deep learning technology has higher accuracy.

In this embodiment, the audio information may include control instruction that is configured to trigger the processor 300 to control the camera 100 to execute a corresponding function and completely free the hands of the user, leading to a higher degree of automation in capturing by the camera 100. The control instruction can include a camera identifier of the camera 100 to be controlled and an action to be executed by the camera 100. In one embodiment, the action to be executed by the camera 100 is configured to instruct the camera 100 to execute a capturing function. The trigger condition can further include, the processor determines that the audio information includes control instruction for instructing the camera 100 to execute the capturing function. Instead of manually triggering the capturing button of the camera 100, the camera 100 is triggered by the processor 300 through the audio information to execute the capturing function. On one hand, the hands of the user can be freed, and the distance between the camera 100 and the user is not limited, the capturing angle can be more flexible, and the user can pose freely. On the other hand, the camera 100 does not vibrate, and the obtained video or image has better quality.

In another embodiment, the action to be executed by the camera 100 is configured to instruct the camera 100 to activate a tracking function. After the processor 300 determines that the camera 100 captures specific characteristic information, the gimbal 200 is controlled to rotate to control the camera 100 to track the target object corresponding to the specific characteristic information, so as to enable the automatic tracking function of the camera 100 through the audio information. Manually turning on the automatic tracking function of the camera 100 by the user is not needed, making it convenient and fast.

In another embodiment, the action to be executed by the camera 100 is configured to instruct the camera 100 to stop a tracking function. After the processor 300 determines that the camera 100 captures specific characteristic information, the gimbal 200 is controlled to stop rotating to control the camera 100 to stop tracking the target object corresponding to the specific characteristic information, so as to disable the automatic tracking function of the camera 100 through the audio information. Manually turning off the automatic tracking function of the camera 100 by the user is not needed, making it convenient and fast.

In one embodiment, a camera identifier of the camera 100 to be controlled is identifier 1, and the control instructions of the camera 100 of identifier 1 can include "ID.1, Selfie Mode," "ID.1, Capture," and "ID.1, Stop." Specifically, when the processor 300 recognizes that the user emits an audio content of "ID.1, Selfie Mode," the processor 300 can control the camera 100 to rotate to face the user through the gimbal 200, thereby enabling the automatic tracking function of the camera 100. The processor 300 can further control the gimbal 200 based on a visual recognition technology to rotate to control the camera 100 to track the target object. When the processor 300 recognizes that the user emits an audio content of "ID.1, Capture," the processor 300 can control the camera 100 to execute the capturing function and obtain a corresponding video or image. When the processor 300 recognizes that the user emits an audio content of "ID.1, Stop," the processor 300 can control the gimbal 200 to stop rotating, thereby disabling the automatic tracking function of the camera 100 and making the camera 100 stop tracking the target object. In this embodiment, the processor 300 can trigger the camera 100 by using the audio information to activate the automatic tracking function, execute the capturing function, and stop the automatic tracking function. The camera 100 can be controlled without a manual operation by the user, and the distance between the camera 100 and the user can be longer. The hands of the user can be freed and the image captured by the camera 100 can be more stable. In this embodiment, before the processor 300 controls the camera 100 to execute the function of turning off the automatic tracking according to the audio content of "ID.1, Stop," the camera 100 has turned on the automatic tracking function. Specifically, the processor 300 controlling the camera 100 to execute the function of turning off the automatic tracking according to the audio content of "ID.1, Stop" is executed after the processor 300 controls the camera 100 to execute the function of turning on the automatic tracking according to the audio content of "ID.1, Stop."

Further, after the processor 300 controls the camera 100 to turn off the automatic tracking function, if it is recognized that the user sends another control instruction that needs to be responded again, for example, the user sends out an audio content of "ID.1, Selfie Mode," the processor 300 can control the camera 100 again to turn on the automatic tracking function. Otherwise, the processor 300 cannot control the camera 100 to execute the automatic tracking function. In this embodiment, the automatic tracking function can refer to a function of controlling the rotation of the gimbal 200 by the processor 300 according to the audio information and visual recognition technology, thereby enabling the camera 100 to locate and lock the user, and generate a continuous following function.

In some embodiments, after the processor 300 controls the gimbal 200 to rotate according to the audio information to control the capturing direction of the camera 100, the processor 300 can further recognize the target object corresponding to the audio information and obtain the characteristic information of the target object. Specifically, the processor 300 recognizing the target object corresponding to the audio information and obtaining the characteristic information of the target object can include controlling the gimbal 200 to rotate to control the camera 100 to aim at the target object according to the audio information, and recognizing the characteristic information of the target object, e.g., facial characteristic information, profile information, etc., according to the capturing image of the camera 100. In this embodiment, when the audio source of the audio information is a mechanical device, the target object is a user closest to the audio source. For example, when a user opens a door, the audio source is the door, and the target object recognized by the processor 300 is the user who opens the door. The gimbal 200 can automatically rotate to face the door and use visual recognition to detect the human face. When the audio source of the audio information is a user, the target object is the audio source. The gimbal can be controlled to rotate by voice to drive the camera 100 to face the speaking user and detect the human face, thereby completely liberate the hands of the user.

After the processor 300 recognizes the target object corresponding to the audio information and obtaining the characteristic information of the target object, the processor 300 can control the gimbal 200 to rotate to control the camera 100 to track the target object according to the characteristic information. In this embodiment, the processor 300 can control the gimbal 200 to rotate to control the camera 100 to implement the tracking of the target object according to the capturing image of the camera 100 and based on a visual recognition technology, and high accuracy in recognizing the target object can be realized. The processor 300 controlling the gimbal 200 to rotate to control the camera 100 to track the target object according to the characteristic information can include controlling the gimbal 200 to rotate to position the target object in the capturing frame of the camera 100 according to the characteristic information, to realize an automatic composition of the camera 100. This can ensure that the camera 100 can always track the target object, and the degree of automation and accuracy of the capturing method are high, providing a relatively great convenience to the user.

In some embodiments, the processor 300 controlling the gimbal 200 to rotate to position the target object in the capturing frame of the camera 100 can include controlling the gimbal 200 to rotate to position the target object at a specific position in the capturing frame of the camera 100. For example, the processor 300 can control the gimbal 200 to rotate to position the face of the target object at the middle position of the capturing frame, or the processor 300 can control the gimbal 200 to rotate to position the face of the target object at the ⅔ height line in the capturing frame, or the processor 300 can control the gimbal 200 to rotate to position other areas of the target object at the middle position, the ⅔ height line, or other positions in the capturing frame.

In some embodiments, the processor 300 controlling the gimbal 200 to rotate to position the target object in the capturing frame of the camera 100 can include controlling the gimbal 200 to rotate so that the target object occupies a preset amount of pixels in the capturing frame of the camera 100. For example, the processor 300 can control the gimbal 200 to rotate to make the pixels of the target object in the capturing frame to be 800*600. Further, the processor 300 can control the gimbal 200 to rotate to position the target object in the capturing frame completely, or the processor 300 can control the gimbal 200 to rotate to position at least part of the target object (including a human face) in the capturing frame.

In this embodiment, the processor 300 can generate a video or an image according to a capturing frame of the camera 100, and a manual operation by the user is not needed, which in turn completely frees the hands of the user and leads to a good user experience. In some embodiments, the processor 300 controlling the gimbal 200 to rotate to control the camera 100 to track the target object according to the characteristic information may further include generating a video or an image according to the capturing image of the camera 100 to realize automatic capturing of the target object.

In some embodiments, the processor 300 controlling the gimbal 200 to rotate to control the camera 100 to track the target object according to the characteristic information may further include generating a video or an image according to the capturing image of the camera 100 and audio information to realize automatic capturing of the target object, where the obtained video or image has richer contents. In this embodiment, when the audio information is an audio content other than control instruction, the video or the image generated by the processor 300 may carry the current audio information.

In some embodiments, as shown in FIG. 1, the camera body 110 further includes a display screen 130 that is electrically connected to the processor 300. The display screen 130 can display a video or an image generated by the processor 300 in real time. In some embodiments, the display screen 130 faces to the user, which is convenient for the user to send control instruction, pose freely or move the position, etc., according to the video or image displayed on the display screen 130, giving the user a richer selfie experience.

In some embodiments, after the processor 300 recognizes the target object corresponding to the audio information and obtains the characteristic information of the target object, audio information can be recognized again, and the target object corresponding to the currently recognized audio information can be recognized, and the characteristic information of the target object corresponding to the currently recognized audio information can be obtained. The processor 300 can determine whether the target object corresponding to the currently recognized audio information and the target object corresponding to the previously recognized audio information are the same target object. If the target object corresponding to the currently recognized audio information and the target object corresponding to the previously recognized audio information are the same target object, the processor 300 can control the gimbal 200 to drive the camera 100 to continuously track the target object. On the other hand, if the target object corresponding to the currently recognized audio information and the target object corresponding to the previously recognized audio information are different target objects, the processor 300 can control the gimbal 200 to rotate the camera 100 to face the target object corresponding to the currently recognized audio information, thereby switching the tracked target object and ensuring the camera 100 is aligned with the target object that is currently emitting the audio information in real time.

Specifically, when the processor 300 determines that the difference between the characteristic information of the target object corresponding to the currently recognized audio information and the characteristic information of the target object corresponding to the previously recognized audio information is larger than a preset difference value, it is indicated that the target object corresponding to the currently recognized audio information by the processor 300 and the target object corresponding to the previously recognized audio information by the processor 300 are different target objects. At this time, the processor 300 can control the gimbal 200 to rotate to control the camera 100 to rotate to face the target object corresponding to the currently recognized audio information, and track the new target object. On the other hand, when the processor 300 determines that the difference between the characteristic information of the target object corresponding to the currently recognized audio information and the characteristic information of the target object corresponding to the previously recognized audio information is smaller than or equal to the preset difference value, it is indicated that the target object corresponding to the currently recognized audio information by the processor 300 and the target object corresponding to the previously recognized audio information by the processor 300 are the same target object. The processor 300 can control the gimbal 200 to rotate to control the camera 100 to continuously track the target object.

In one embodiment, the processor 300 can determine whether the target objects recognized at two different moments are the same target object according to the facial characteristic information of the target objects recognized at the two different moments. When the difference between the facial characteristic information of the target objects recognized at the two different moments is larger than, e.g., 5%, it is indicated that the target objects recognized at the two different moments by the processor 300 are different target objects. The processor 300 can control the gimbal 200 to rotate to control the camera 100 to rotate to face the most recently recognized target object. On the other hand, when the difference between the facial characteristic information of the target objects recognized at the two different moments is smaller than or equal to, e.g., 5%, it is indicated that the target objects recognized at the two different moments by the processor 300 are the same target object. The processor 300 can control the gimbal 200 to rotate to control the camera 100 to always aim at the target object. In this embodiment, all the terms "object target" can refer to a user. When the audio source of the audio information is a mechanical device, the target object is the user closest to the audio source. When the audio source of the audio information is a user, the target object is the audio source, i.e., the user that is speaking.

The present disclosure also provides a computer-readable storage medium, where a computer program is stored. When the program is executed by the processor 300, the capture method according to above embodiments is implemented.

As for the device embodiment, since it basically corresponds to the method embodiment, reference may be made to the description of the method embodiment for the relevant parts. The above devices are merely illustrative, where the units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure. Those of ordinary skill in the art can understand and implement without creative efforts.

The description of "specific" or "some embodiments" means that specific features, structures, materials, or characteristics described in conjunction with the embodiments or examples are included in at least one embodiment or example of the present disclosure. In this specification, the schematic expressions of the above terms do not necessarily refer to the same embodiment or example. The specific features, structures, materials, or characteristics described may be combined in any suitable manner in one or more embodiments or examples.

Any process or method description in a flowchart or otherwise described herein can be understood as representing a module, fragment, or portion of code that includes one or more executable instruction for implementing a particular logical function or step of a process. And the scope of the embodiments of the present disclosure includes additional implementations in which the functions may be performed out of the order shown or discussed, including performing functions in a substantially simultaneous manner or in the reverse order according to the functions involved, which should be understood by those skilled in the art.

The logic and/or steps represented in the flowchart or otherwise described herein, for example, a sequenced list of executable instruction that can be considered to implement a logical function, can be embodied in any computer-readable medium and used by an instruction execution system, device, or device (e.g., a computer-based system, a system including a processor, or other systems that can fetch and execute instruction from an instruction execution system, device, or equipment), or can be used in combination with these instruction execution systems, devices or equipment. In this specification, a "computer-readable medium" may be any device that can contain, store, communicate, propagate, or transmit a program for use by or in connection with an instruction execution system, device or equipment. A more specific example (non-exhaustive list) of computer-readable media can include, electrical connection (electronic device) with one or more wires, portable computer disk enclosure (magnetic device), random access memory (RAM), read-only memory (ROM), erasable and programmable read-only memory (EPROM or Flash memory), fiber optic devices, and portable compact disc read-only memory (CDROM). The computer-readable medium may further be paper or other suitable medium on which the program can be printed, as it can be performed, for example, by optically scanning the paper or other medium, followed by editing, interpretation, or other suitable method if necessary to process to obtain the program electronically and then store it in computer memory.

It should be understood that each part of the present disclosure may be implemented by hardware, software, firmware, or a combination thereof. In the above embodiments, multiple steps or methods may be implemented by software or firmware stored in a memory and executed by a suitable instruction execution system. For example, if implemented in hardware, as in another embodiment, it may be implemented using any one or a combination of the following techniques known in the art, e.g., discrete logic circuits with logic gate circuits for implementing logic functions on data signals, special-purpose integrated circuits with suitable combinational logic gate circuits, programmable gate arrays (PGA), and field programmable gate arrays (FPGA), etc.

Those of ordinary skill in the art can understand that all or some of the steps carried by the above implementation method can be completed by a program instructing related hardware. The program can be stored in a computer-readable storage medium. When the program is being executed, one or a combination of steps of a method embodiment can be included.

In addition, the functional units in the various embodiments of the present disclosure may be integrated in one processing unit, or each unit may be an individual physically unit, or a plurality of units may be integrated in one unit. The above integrated modules can be implemented in the form of hardware or software functional modules. A method consistent with the disclosure can be implemented in the form of computer program stored in a non-transitory computer-readable storage medium, which can be sold or used as a standalone product.

The above described storage medium may be a read-only memory, a magnetic disk or an optical disk, etc. Although the embodiments of the present disclosure have been shown and described above, it can be understood that the above embodiments are exemplary and should not be construed as limitations on the present disclosure. Those skilled in the art can change, modify, substitute, and transform the above embodiments within the scope of the present disclosure.

What is claimed is:

1. An image capture method comprising:
   recognizing audio information, the audio information being associated with an audio source;
   controlling a gimbal to rotate according to the audio information to control a capture direction of a camera;
   recognizing a target object corresponding to the audio information, including:
     determining that the audio source is a mechanical device; and
     determining that the target object is a user spatially closest to the audio source; and
   controlling the camera to execute a capturing function in response to determining that the camera meets a trigger condition.

2. The image capture method of claim 1, wherein recognizing the audio information includes recognizing the audio information through an audio recognition device of the camera.

3. The image capture method of claim 1, wherein recognizing the audio information includes:
   receiving voice data collected by an audio collection device of the camera; and
   recognizing the audio information of the voice data.

4. The method of claim 3, wherein:
   the audio information includes a direction of the audio source; and
   recognizing the audio information of the voice data includes recognizing the direction of the audio source of the voice data according to a voice recognition model.

5. The method of claim 4, further comprising, before recognizing the direction of the audio source of the voice data according to the voice recognition model:
   obtaining the voice recognition model based on a deep learning technology.

6. The method of claim 4, wherein controlling the gimbal to rotate according to the audio information to control the capture direction of the camera includes controlling the gimbal to rotate to control the camera to rotate to face the audio source.

7. The image capture method of claim 1, wherein:
   the trigger condition includes that the camera captures specific characteristic information, and the specific characteristic information includes facial characteristic information; and
   the audio information includes a control instruction including a camera identifier of the camera and an action to be executed by the camera.

8. The method of claim 7, wherein:
the action to be executed by the camera includes executing the capturing function; and
the trigger condition further includes that the audio information includes a control instruction for instructing the camera to execute the capturing function.

9. The method of claim 7, wherein:
the action to be executed by the camera includes activating a tracking function;
the method further comprising, after determining that the camera captures the specific characteristic information:
controlling the gimbal to rotate to control the camera to track the target object corresponding to the specific characteristic information.

10. The method of claim 7, wherein:
wherein the action to be executed by the camera includes stopping a tracking function;
the method further comprising, after determining that the camera captures the specific characteristic information:
controlling the gimbal to stop rotating to control the camera to stop tracking the target object corresponding to the specific characteristic information.

11. The image capture method of claim 1, further comprising, after controlling the gimbal to rotate according to the audio information to control the capture direction of the camera:
obtaining characteristic information of the target object.

12. The method of claim 11, further comprising, after recognizing the target object corresponding to the audio information and obtaining the characteristic information of the target object:
controlling the gimbal to rotate to control the camera to track the target object according to the characteristic information.

13. The method of claim 12, wherein controlling the gimbal to rotate to control the camera to track the target object according to the characteristic information includes controlling the gimbal to rotate to position the target object in a capturing frame of the camera according to the characteristic information.

14. The method of claim 13, wherein controlling the gimbal to rotate to position the target object in the capturing frame of the camera according to the characteristic information includes controlling the gimbal to rotate to position the target object at a specific position in the capturing frame of the camera.

15. The method of claim 13, wherein controlling the gimbal to rotate to position the target object in the capturing frame of the camera according to the characteristic information includes controlling the gimbal to rotate so that the target object occupies a preset amount of pixels in the capturing frame of the camera.

16. The method of claim 12, wherein controlling the gimbal to rotate to control the camera to track the target object according to the characteristic information further includes:
generating a video or an image according to images captured by the camera; or
generating a video or an image according to the images captured by the camera and the audio information.

17. The method of claim 11,
wherein the audio information is first audio information, the target object is a first target object, and the characteristic information is first characteristic information;
the method further comprising, after recognizing the first target object corresponding to the first audio information and obtaining the first characteristic information of the first target object:
recognizing second audio information;
recognizing a second target object corresponding to the second audio information and obtaining second characteristic information of the second target object corresponding to the second audio information, and
controlling the gimbal to rotate to control the camera to rotate to face the second target object in response to determining that a difference between the first characteristic information and the second characteristic information is larger than a preset difference value.

18. The image capture method of claim 1, wherein controlling the camera to execute the capturing function in response to determining that the camera meets the trigger condition includes controlling the camera to execute an instant capturing function, a time-lapse capturing function, or a continuous capturing function in response to determining that the camera meets the trigger condition.

* * * * *